INVENTORS: C. C. CUTLER
J. T. MENDEL
BY
Hugh S. Wertz
ATTORNEY

FIG. 4

INVENTORS: C. C. CUTLER
J. T. MENDEL
BY
Hugh S. Wertz
ATTORNEY

United States Patent Office 2,925,520
Patented Feb. 16, 1960

2,925,520

TRAVELING WAVE TUBE

Cassius C. Cutler, Gillette, and John T. Mendel, Berkeley Heights, N.J., assignors to Bell Telephone Laboratories, Incorporated, New York, N.Y., a corporation of New York Application August 26, 1954, Serial No. 452,248

17 Claims. (Cl. 315—3.6)

This invention relates to devices which utilize the interaction between an electron beam and a traveling electromagnetic wave over a distance equal to a plurality of operating wavelengths. Such devices are now commonly described as traveling wave tubes.

It is an object of this invention to provide a traveling wave tube which is susceptible to a number of specialized applications.

More particularly, it is an object of this invention to provide a traveling wave tube whose transmission characteristics are related to signal amplitude level by a velocity sorting of electrons in its beam. Such a velocity sorting advantageously is achieved by modifications in the focusing arrangement.

In general, apparatus having nonlinear transmission characteristics which are related to signal amplitude level are commonly known as expanders, limiters, and slicers, depending upon the particular relationship of signal level to transmission characteristic.

For example, the term "expander" is used to characterize such apparatus which accentuates the differences in signal amplitude level. Thus, signals of small amplitude are amplified only slightly, while signals of large amplitude are amplified to a much greater degree.

The term "limiter" characterizes apparatus which amplifies signals linearly up to a certain amplitude level, and amplifies signals above this level in a nonlinear fashion. Usually the nonlinear characteristic is in a decreasing amplification direction, and thus a fairly uniform upper signal limit can be maintained.

The term "slicer" denotes apparatus which amplifies nonlinearly up to a minimum signal level, amplifies linearly above this level up to a maximum signal level, and amplifies nonlinearly above this maximum level whereby signals of low amplitude level are only slightly amplified, if at all, and signals of high level are limited, while signals of intermediate level are amplified linearly. The region of linearity may be very small such that the characteristic consists essentially of a low level range involving expansion, and a high level range having limiting action.

Various types of apparatus are known for achieving the transmission characteristics of the various circuits described above, but in general, such apparatus is not readily adaptable to frequencies in the microwave range. On the other hand, traveling wave tubes are capable of operating at millimeter wavelengths, but have heretofore not lent themselves readily to the variety of specialized applications mentioned above.

The present invention is based upon recent investigations into the behavior of traveling wave tubes for varying degrees of input signal level. Before discussing these investigations, it is necessary first to review briefly the operation of a traveling wave tube.

In a traveling wave tube, an electron stream is projected closely past an interaction circuit along which the signal wave is propagating. When the signal wave is propagated along the circuit in a manner such that there is a component of electric field of the wave which is parallel to the beam, interaction between the beam and the wave takes place. Such interaction takes the form both of extraction of energy from the electron beam by the wave and in the extraction of energy from the wave by the beam. Over a plurality of operating wavelengths, there will be more energy extracted from the beam than is returned to it, resulting in a net decrease in energy content of the beam, and reflected by a decrease in the average velocity of the electrons in the beam and a net increase in the amplitude of the wave. During interaction, the energy extracted from the wave by the beam will serve to accelerate some of the electrons in the beam, while the extraction of energy from the beam by the wave results in a deceleration of some of the electrons in the beam. This interaction thus superimposes on the D.-C. velocity of the beam an A.-C. velocity component and results in bunches in the beam of high electron density interposed between regions of low electron density.

In a copending United States patent application of C. C. Cutler, Serial No. 452,247, filed August 26, 1954, the results of recent investigations into the behavior of the electrons within the beam are discussed in detail. As a result of those investigations, it is now possible to predict the behavior of the electrons under the influence of different signal levels, including those signal levels where the traveling wave tube overloads. With the insight thus gained into the behavior of the electrons within the beam, Cutler, in the aforementioned application, was able to show how, through the use of periodic focusing, it was possible to eliminate undesirable electrons from the beam to improve the efficiency of the tube. The present invention likewise makes use of the results of the investigations and of periodic focusing to achieve desired selective amplification characteristics.

For a complete understanding of magnetic periodic focusing, reference should be had to the copending applications of J. R. Pierce, Serial No. 351,983, filed April 29, 1953, now United States Patent 2,847,607, issued August 12, 1958, and Serial No. 351,984, filed April 29, 1953, now United States Patent No. 2,841,739, issued July 1, 1958. However, a brief description of this type of focusing will be given here to facilitate an understanding of the present invention. It is to be understood that while the principles of the invention will be set forth with greatest particularity in its application to magnetic focusing, the invention is equally applicable to other types of focusing, such as electrostatic, as will be described briefly hereinafter, and accordingly, applicants do not intend to limit themselves to magnetic focusing alone.

Analysis has revealed that an essentially non-diverging beam may be obtained if the root mean square value of the longitudinal magnetic field in the vicinity of the beam has the same magnitude as the uniform axial field-characteristic of the type of focusing known as Brillouin focusing. For a given average field value, a larger root mean square field value results if the field is concentrated in a succession of relatively short regions instead of being uniform over a relatively long region. Accordingly, a high root mean square value of longitudinal magnetic field in the vicinity of the beam important for good focusing can be achieved with a minimum of driving magnetomotive force by concentrating the longitudinal magnetic field along a periodic series of short gaps along the beam path. Assuming that along the length of the tube, that is, the path of flow, the regions of longitudinal magnetic field are short compared to the distance separating them, the succession of focusing fields may be regarded as a series of thin converging lenses. If the beam is started in such a manner that it is cylindrical midway between two adjacent lenses, and if the lenses are chosen of the right strength, the flow will be cylindrical between the next two lenses. The converging effect of the lenses is on the average just balanced out by the diverging effect of the space charges within the beam between the lenses, and the electron beam flow is identical between each pair of lenses. Unlike the case of a uniform magnetic field, in the periodic field the focusing is not necessarily improve by increasing the magnetic field strength beyond the theoretical required value. Instead there are encountered regions of magnetic field strength which cause the beam to diverge. For a given magnetic field strength, the velocity of an electron within the beam determines whether that particular electron is focused or defocused. Defocused electrons, if the defocusing is sufficient, may be completely expelled from the beam. This difference in behavior of electrons within the beam under the influence of a periodic magnetic field gives rise to "pass" bands, that is, for a given magnetic field a range of velocities where the electrons will be focused, and "stop" bands, where, for the same magnetic field, there is a range of velocities where the electrons will be defocused.

The present invention makes use of this phenomenon in a manner which will be more fully explained hereinafter to eliminate from the electron beam those electrons in the beam whose velocities correspond to signal levels which it is desirous not to amplify, with the net result that a non-linear amplification characteristic will be obtained.

In a preferred embodiment of the invention, a succession of magnetic pole pieces are spaced uniformly along a portion of the length of the tube, and are joined together by permanent magnets in such a manner that adjacent pole pieces will be of opposite polarity. Such an arrangement has the effect of imparting a uniform periodicity to the magnetic focusing field. For reasons which will be more fully explained hereinafter, at a predetermined point along the interaction circuit intermediate its ends, the characteristics of the magnetic focusing field are made to change abruptly, with the result that there will be an abrupt change in the focusing of the electrons within the beam.

Various other illustrative embodiments will be described herein, each of which is characterized by an arrangement establishing along the path of flow a discontinuity in the focusing field by a variation in one or more of the several parameters upon which the focusing effect depends, so that the focusing effect after the discontinuity differs from the focusing effect before the discontinuity.

The invention will be better understood from the following detailed description taken in conjunction with the accompanying drawings, in which.

Figure 1:
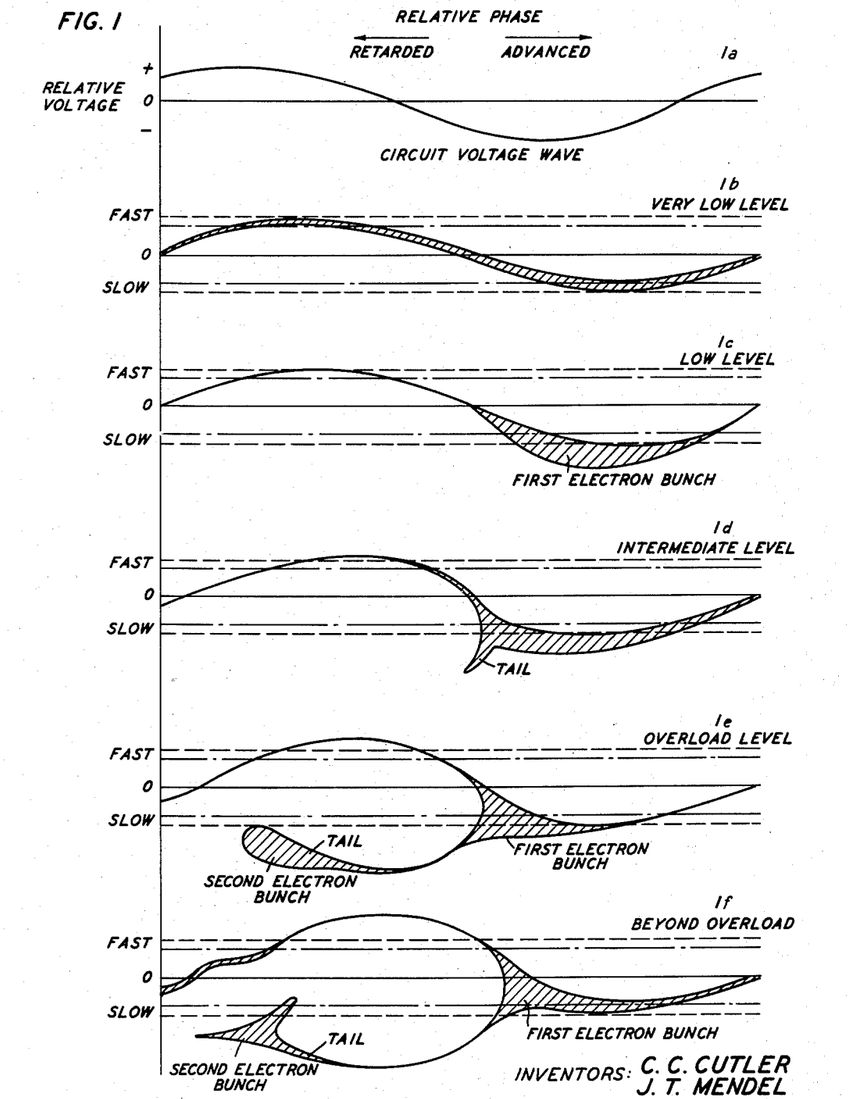
Fig. 1 is a series of pictorial diagrams of the velocity distribution of electrons in the beam for varying signal levels.

Turning now to Fig. 1, there is shown a series of pictorial diagrams of the results of the aforementioned Cutler investigations. A detailed explanation of these diagrams may be found in the aforementioned Cutler application; however, a brief explanation is necessary here to facilitate understanding of the present invention.

Fig. 1(a) represents the voltage wave in the wave propagating circuit which, for simplicity, is shown as sinusoidal. If this wave corresponds to a very low level input signal, and a beam of electrons is directed along the wave propagation circuit for interaction with the wave, at regions well along the wave circuit, a velocity modulation of electrons within the beam takes place. This velocity modulation is pictured in Fig. 1(b) wherein the ordinate represents velocity and the abscissa represents phase. The origin on the ordinate scale represents the average or D.-C. velocity of the electron beam. The curve of Fig. 1(b) represents the distribution of electrons within the beam relative to the phase of the wave, and the velocities of the electrons for a given phase angle. It can be seen in Fig. 1(b), that for a very low level input, there is a wide distribution of electrons within the beam as to phase, but only a small velocity modulation has taken place. The slight bunching of electrons in the slow velocity region of the curve represents those electrons which have slowed down as a result of having given up some of their energy to the wave. When the signal level is increased somewhat, the velocity distribution as diagrammed in Fig. 1(c) results. It can be seen that the bunching of electrons in the slow velocity region is more pronounced than it was for the very low level signal, while the phase spread of the electrons has become much less uniform. Fig. 1(d) represents the velocity distribution for an intermediate level signal. The "tail" which has developed at the rear of the slow bunch represents electrons at the rear of the main bunch which are repelled by space charge forces within the bunch, resulting in those electrons being still further slowed down. This decrease in velocity causes these electrons to fall back in phase with respect to the bunch, with the consequence that the "tail" develops. When the signal level is increased to the overload point, the velocity distribution of Fig. 1(e) results. It can be seen in Fig. 1(e) that a large number of electrons have fallen back in phase relative to the main bunch. Likewise, in Fig. 1(f) which represents the distribution for signals above the overload level, there is a second large group of electrons. For a complete explanation of the significance of these "tails," and their cause and effect, reference should be had to the aforementioned Cutler application. It is sufficient for an understanding of the present invention to realize merely that these phenomena occur.

If a periodic focusing arrangement is used to focus the electron beam, and the parameters of the field are adjusted so that electrons within the velocity range defined by the dotted lines in Figs. 1(b) through 1(f) are focused, while electrons having velocities above and below the velocity range so defined are defocused, it can be seen that the amplifying action of the tube will be dependent upon the signal input level. Electrons having velocities within the focusing range, i.e., pass band, interact with the traveling wave, but electrons having velocities in the regions outside the pass band, will be defocused and so cannot act to amplify. Thus it can be seen that as long as the signal level is low enough, amplification takes place linearly, but after the signal level exceeds a certain value, the amplification becomes non-linear. The action just described is typical of the action of a limiter circuit. It is obvious that the signal level at which limiting commences can be varied by and adjustment of the width of the pass band of electron velocities.

If, instead of the electrons within the range about the average or D.-C. velocity being focused, they are defocused, as indicated by the dash-dot lines in Figs. 1(b) through 1(f), it can be seen that very low level signals are not amplified, since the velocity modulation of the beam is not sufficient to give any of the electrons a velocity sufficient to carry it into a velocity range where focusing occurs. However, for increasingly higher level signals, more of the electrons are given velocities which place them within a pass band, and more interaction and consequent amplification of the wave takes place. Thus, low level signals are amplified only slightly or not at all, whereas with increasing level greater amplification results. This action is typical of an expander circuit.

Figure 2:
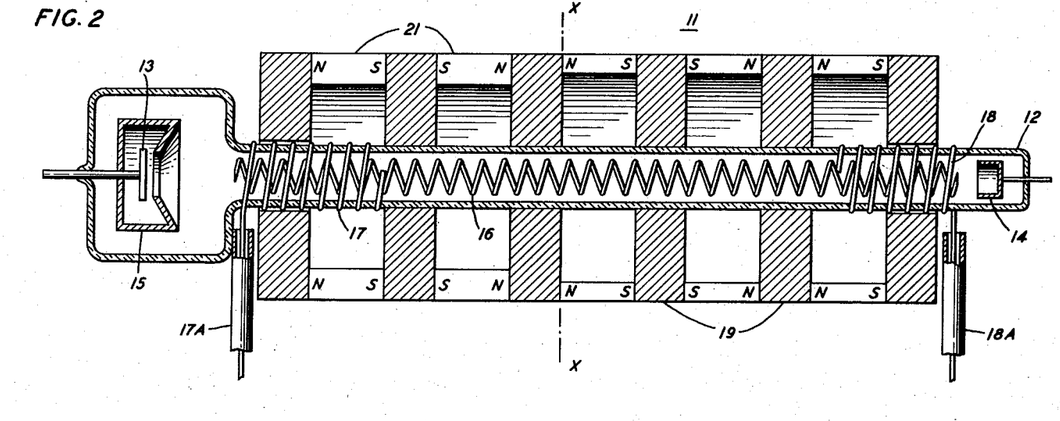
Fig. 2 is a sectional view of one preferred embodiment of the invention.

In Fig. 2 there is illustrated schematically a traveling wave tube 11 embodying the principles of the invention. Located at opposite ends of an evacuated elongated envelope 12, which, for example, is of glass, any suitable nonmagnetic material, or of magnetic material which will saturate readily, are a source of a solid beam of electrons 13 and a target or collector electrode 14. The electron source 13 is shown schematically and will, in general, consist of an electron emissive cathode, a heater unit, an intensity control element, and an electrode arrangement 15 for shaping and accelerating the beam. The target 14 serves as a collector of electrons and is, accordingly, maintained at a suitable potential positive with respect to the electron emissive cathode of the source 13 by means of suitable lead-in connections from a voltage source, not here shown. In conventional traveling wave tubes an electrode member maintained at a positive potential with respect to the cathode of the electron source is disposed along the path of flow for providing an accelerating field. In most traveling wave tubes, the interaction circuit itself serves as such an electrode. In the tube of Fig. 2, the interaction circuit comprises a helically coiled conductor 16, a plurality of operating wavelengths long, which serves as a propagating circuit for electromagnetic waves. The pitch of the helix determines the velocity with which the wave propagates down the length of the tube, and this pitch is adjusted to propagate the wave in coupling relationship with the electron beam. In addition, the helical interaction circuit 16, in the embodiment here shown, serves as the accelerating electrode for the electron beam, and so is maintained at a suitable positive potential with respect to the cathode of the electron gun.

At each end, the helix 16 is connected to an external transmission line by suitable coupling. As shown, at the input end, the coupling means comprises the helix 17 wound in a sense opposite to that of helix 16 and surrounding the tube envelope along a region overlapping the input end of the helix 16. The end of the helix 17 adjacent the end of the helix 16 is connected to the inner conductor of the coaxial line 17A which forms the external transmission line leading to the signal source and its opposite end is terminated to be substantially reflectionless. Coupled helix arrangements of this kind are described more fully in copending application Serial No. 360,579, filed June 9, 1953, by R. Kompfner now United States Patent No. 2,834,908, issued May 13, 1958. At the output end, energy is transferred for utilization from the helix 16 to an external transmission line 18A in a manner analogous to that described for the input end. Various other arrangements for coupling to and from a helix interaction circuit may be substituted for that here shown. It is to be understood also that while the interaction circuit is shown as helix 16, it may take any one of a number of forms well known to those skilled in the art, such as, for example, a wave guide having serrated or ridged walls.

Disposed along the path of flow, and uniformly spaced from each other is a plurality of annular pole pieces 19 of material having a high magnetic permeability. A series of bar magnets 21 is disposed across successive gaps between the pole pieces, the magnets across adjacent gaps being reversed in sense whereby there results along the path of electron flow a succession of regions of longitudinal magnetic fields, the direction of the magnetic fields reversing with each successive region. Such a magnetic field may be characterized as time-constant spatially-alternating.

In the aforementioned Pierce patents, the phenomena of "stop" and "pass" bands in conjunction with periodic focusing are discussed at length. It is there shown that these phenomena depend upon the parameters of magnetic field strength, periodicity of the magnetic field, and the accelerating voltage or velocity of electrons in the beam. By proper proportioning of these parameters, it is possible to focus electrons having velocities within certain ranges, and defocus electrons having velocities within other ranges. In the tube of Fig. 2, initially the periodic focusing field parameters are so chosen that all of the electrons within the beam will be focused, regardless of signal input level. At a predetermined point intermediate the ends of the tube in the embodiment of Fig. 2, the strength of the magnetic field is changed so that stop and pass bands will act to sort the electrons within the beam, in the manner discussed in connection with Fig. 1. The choice of the point at which this abrupt discontinuity occurs depends upon many factors. One possible choice would be at that point in the tube where $CN=0.2$, where C is the gain parameter of the tube and N is distance in wavelengths. C is defined by the relationship $$C^3 = K\frac{I_0}{4V_0}$$

and $$K = \frac{E^2}{2\beta^2 P}$$

where E is the peak voltage acting upon the electrons, $\beta$ is the phase constant of the circuit, P is the power flow, $V_0$ is the beam voltage, and $I_0$ is the beam current. In Fig. 2, this discontinuity is illustrated by a decrease in the size of the permanent magnets between the pole pieces, such decrease occurring at the point X—X in Fig. 2. The tube of Fig. 2 is readily adaptable for use as either a limiter or expander, thus, for limiting action, the point X—X defines the point at which the periodic focusing field is adjusted to define a pass band, the range of electron velocities wherein focusing occurs determining the limiting level. For expander action, the point X—X defines the point at which the periodic focusing field is adjusted to define a stop band, the range of electron velocities wherein defocusing occurs determining the level at which linear amplification commences.

Figure 3:
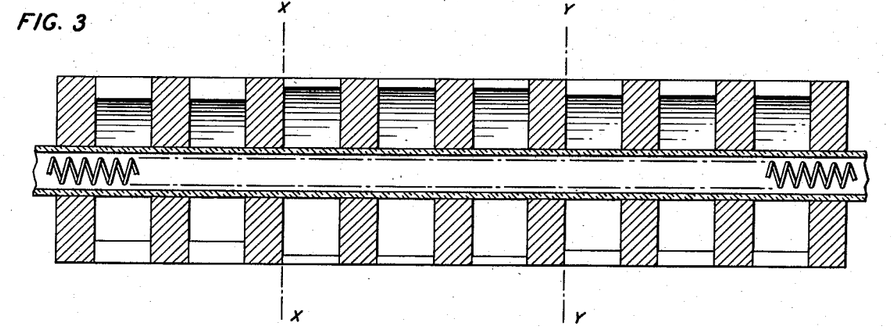
Fig. 3 is a sectional view of the focusing arrangement of a second embodiment of the invention.

For slicer action, the tube of Fig. 2 is modified slightly inasmuch as slicing is, in effect, a combination of expanding and limiting. In Fig. 3 there is shown a modified focusing system for the tube of Fig. 2. As in the case of the limiter and expander, it is desirable to focus the beam over the initial portion of the interaction circuit, and then to commence abruptly a first sorting by velocity selection of electrons in the beam at the point X—X. For slicer applications, this first sorting is advantageously of the kind use for expander action, that is, electrons with small amounts of velocity modulation corresponding to low level signals are defocused, whereas electrons whose velocities depart widely from the average velocity are focused. At a later point Y—Y along the interaction path, a second abrupt change in the focusing field occurs, and a range of velocities of the electrons about the D.-C. velocity defines the electrons which will be focused, so that there is a change from expander action to limiter action. In operation electrons are initially focused, then those electrons whose velocities are only slightly different from the D.-C. velocity are defocused and expelled from the beam. Subsequently, those electrons whose velocities deviate widely from the D.-C. are defocused. The range in which linear amplification takes place is, therefore, defined by the difference in the maxima and minima of the velocity ranges. The velocity range in which the defocusing occurs determines the lower signal level while the velocity range in which focusing occurs determines the upper signal level. Various methods may be used to control the limits of these velocity ranges. One method which is desirable because of its simplicity is to shape the magnetic field. Inasmuch as, in periodic focusing of the kind of principal interest, successive field regions are reversed in polarity, the overall focusing field has an alternating character. By shaping the pole pieces, it is possible to give to the magnetic field an alternating character which can be varied from sinusoidal to a substantially square wave. Thus, very narrow pole pieces widely separated will impart a substantially square wave shape, with consequent narrow stop bands and wide pass bands.

In general, it is desirable to suppress reflected wave energy in a traveling wave tube by inserting loss in the wave circuit. Loss insertion usually takes the form of a coating of lossy material on the helix supports, or, sometimes, on the helix itself. In the case where the tube of Fig. 2 is used as a limiter, it is preferable to insert the loss near the input end of the wave circuit, that is, on the input side of the focusing discontinuity, whereas, in the expander application, the loss is preferably on the output side of the focusing discontinuity. In the case of a slicer, loss is inserted near both the input and output ends, or near the output end only.

During the defocusing action, undesirable electrons are expelled from the beam. These expelled electrons must necessarily be collected. In practice, it has been found that a wave propagating circuit which surrounds the beam itself serves as an electrode for collecting the expelled electrons. In the case of metallic envelope tubes, the walls of the tube may be made to act to collect the electrons. In some cases, special collector electrodes may be advantageously positioned along the length of the tube to collect the expelled electrons.

Figure 4:
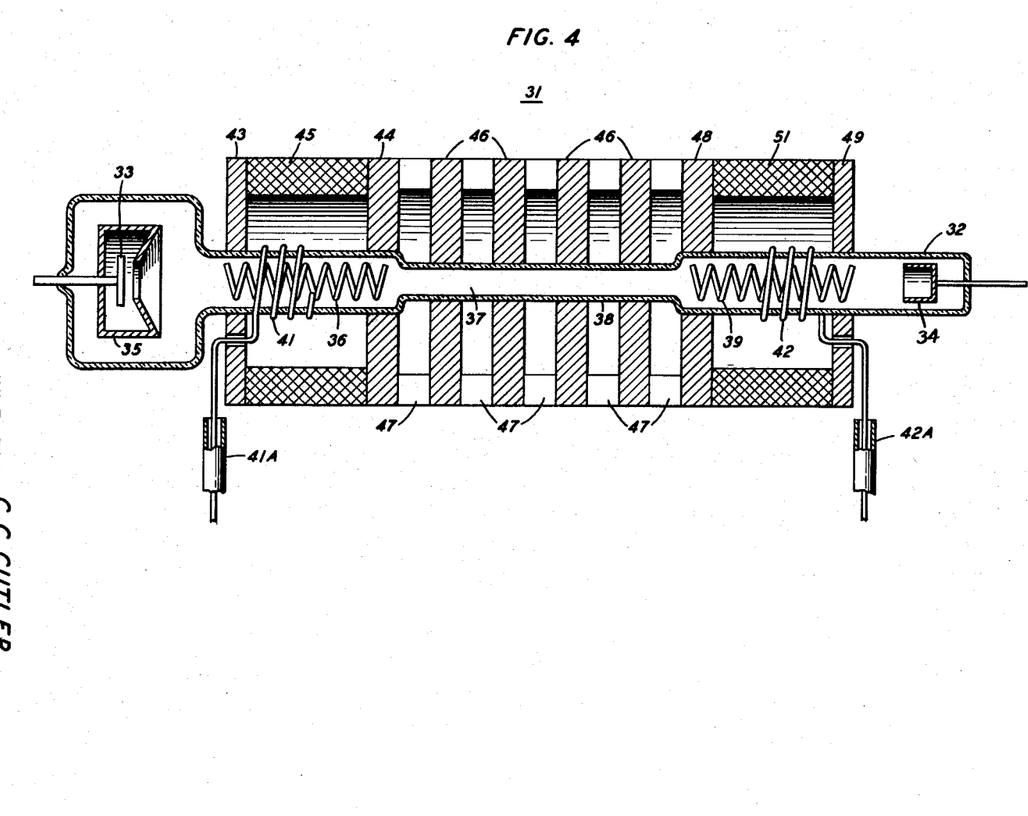
Fig. 4 is a sectional view of still another embodiment.

In the tube shown in Figs. 2 and 3, periodic focusing is used advantageously throughout its length, although periodic focusing need necessarily be used only in the region where the storing action takes place. In Fig. 4 there is shown as another embodiment a traveling wave tube 31 wherein both a uniform focusing field and periodic fields are used. As with the tube of Figs. 2 and 3, tube 31 comprises an elongated evacuated envelope 32 of glass or non-magnetic metal, having at its ends an electron beam source 33 and a target or collector electrode 34. Electron source 33 and associated electrode 35 act to shape and accelerate the beam as with the tube of Figs. 2 and 3. Target 34 is maintained at a suitable positive potential for collecting the electrons.

The interaction circuit comprises a first helically coiled conductor 36 a plurality of wavelengths long, a drift space 37 a plurality of wavelengths long which is defined by a reduced diameter portion 38 in the envelope 32, and a second helically coiled conductor 39 a plurality of wavelengths long. Helix 36 is connected at one end to an external transmission line by a suitable coupling, shown here by way of example as a helix 41 connecting with a coaxial line 41A, in the same manner as explained in connection with Fig. 2. In a like manner, helix 39 is coupled at one end to a helix 42 which in turn connects to coaxial line 42A.

That portion of the interaction circuit which includes only helix 36 is subjected to a uniform magnetic focusing field supplied by pole pieces 43 and 44 and magnet 45 which though shown here as a permanent magnet may alternatively be an electromagnet. Along the drift space there is arranged a plurality of pole pieces 46 separated by magnets 47 which establish a periodic focusing field along the drift region. The last portion of the interaction circuit which includes helix 39 is subjected to a uniform magnetic field by pole pieces 48 and 49 and magnet 51. The reduced diameter portion 38 serves to allow positioning of the magnets and pole pieces closer to the electron beam than otherwise possible so that the focusing action on the beam may be improved.

In operation, as was the case with the tube of Fig. 2, limiting action is achieved by appropriate choice of the parameters of the periodic focusing so that a pass band of desired width is presented to the beam. However, in this tube by virtue of the closer proximity of the pole pieces to the beam in the drift space, the sorting action is greatly improved, and more efficient limiting is attained. In the case where the envelope 32 is made of metal, the walls of the envelope serve to collect the defocused electrons. If envelope 32 is non-conducting, it becomes necessary to coat its inner walls along the drift space with conducting material in order to collect the defocused electrons. When the beam leaves the drift space and enters the last portion of the interaction circuit, the only electrons remaining in the beam are those whose velocities correspond to the range of signal level over which linear amplification is desired, and therefore the beam induces in helix 39 a wave which is of the desired amplitude. Expander action is achieved in a similar manner, with the parameters of the periodic focusing system being chosen to present a stop band to the electrons whose velocities correspond to low signal levels, as explained heretofore. Slicing action is achieved by dividing the drift space into two sections of different periodic focusing fields, each section being a plurality of wavelengths long. The periodic focusing in the first section of the drift space is chosen to present a stop band to the beam as explained in the foregoing, and the focusing in the last half of the drift space is chosen to present a pass band. In the tube of Fig. 4, loss is inserted in helices 36 and 39 at the ends thereof proximate the drift space to avoid reflection effects.

While the embodiments thus far described have utilized magnetic focusing utilizing permanent magnets, as previously indicated it is to be understood that electromagnets may be used instead. Furthermore, applicants do not intend to limit the scope of their invention to magnetic periodic focusing only, inasmuch as the principles of the invention are applicable to electrostatic focusing as well.

Figure 5:
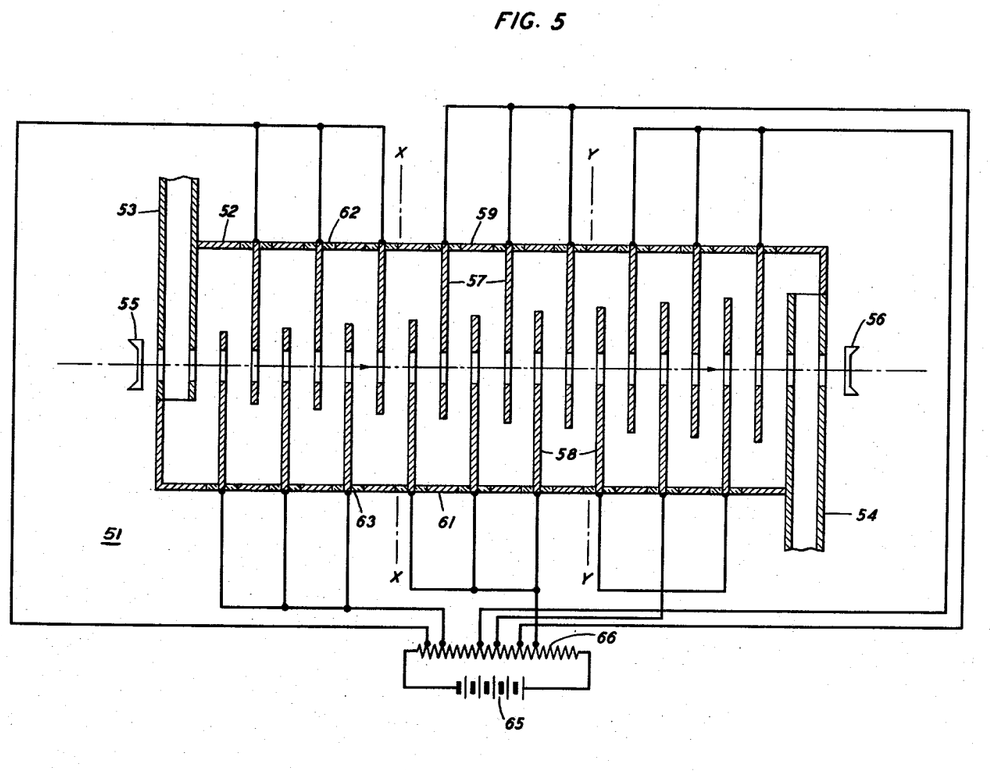
Fig. 5 is a sectional view of an electrostatic focusing arrangement embodying the principles of the invention.

In Fig. 5 is shown a traveling wave tube embodying the principles of the invention as applied to electrostatic focusing. The principles of electrostatic focusing are clearly set forth in the copending United States patent application Serial No. 364,242, filed June 26, 1953, by P. K. Tien, now United States Patent No. 2,843,776, issued July 15, 1958. In such an arrangement electric lines of force are set up between successive electrodes along the beam path, successive electrodes being of opposite polarity with respect to the mean potential between adjacent electrodes. Such an arrangement presents to the beam periodic electrostatic focusing fields which act in much the same manner as magnetic periodic focusing fields. In Fig. 5, tube 51 comprises a wave guiding circuit 52 which is, for example, a hollow wave guide of rectangular cross section which is folded back and forth upon itself in serpentine fashion. Wave energy is supplied at the input end 53 which may, for example, be a continuation by way of a pressure-tight window, not shown, of a conventional rectangular wave guide. In like manner, wave energy is extracted from the tube at the output 54 through a similar connection to a conventional rectangular wave guide. A source 55 of an electron beam is located adjacent the input end of the wave circuit and oriented to direct an electron stream along the tube transversely of the folds in the wave guide. Source 55 is shown schematically and may take any one of a number of suitable forms, such as the electron gun structure shown and described in the aforementioned Tien patent. A collector electrode 56 is positioned at the output end of the tube in target relation to the gun 55 for collecting the spent beam. The folds of the wave guide are formed by a plurality of plates 57, 57 and 58, 58 which are of a suitable conducting material, such as copper, extending from opposite walls 59 and 61 respectively, which are also of conducting material. Each of the plates 57, 57 is capacitively connected to the wall 59 by a condenser 62 and each of the plates 58, 58 is capacitively connected to the wall 61 by a condenser 63. The capacitive connection makes possible D.-C. isolation of the various plates so that different voltages may be applied to successive plates to achieve electrostatic focusing. Capacitive connections 62 and 63 may be made by separating each plate 57 and 58 from the wall by thin sheets of suitable dielectric, such as mica. If the connection is made quite thin, the radio frequency properties of the wave circuit are unaffected.

A suitable voltage source 65 and a voltage dividing resistor 66 supply the necessary potentials for application to the plates 57, 57 and 58, 58. Coupling with the electron beam is achieved by slotting or boring the plates to permit passage of the beam through the plates and the regions therebetween. As was the case with the preceding embodiments, uniformity of focusing is desirable over the first portion of the interaction circuit, hence plates 57, 57 are supplied with a single potential, and plates 58, 58 are supplied with a single potential differing from the potential on plates 57, 57. At point X—X in the tube, the location of which, as was pointed out before, may be at $CN=0.2$, the potential on the plates is abruptly changed to present either a pass band or a stop band to certain electrons within the beam, as was discussed in connection with the tubes of Figs. 2, 3 and 4, depending upon whether limiting, expanding, or slicing is desired. At a second point Y—Y, separated from point X—X by a plurality of wavelengths, the potential is abruptly changed again, in the same manner that the magnetic field of the structure of Fig. 3 is changed, to accomplish the slicing action.

In all of the embodiments herein shown and described, each successive region in which focusing takes place must necessarily be many operating wavelengths long for full traveling wave tube action to take place. While specific structures have herein been shown as embodying the principles of the present invention, it is obvious that these principles are applicable to many other types of apparatus wherein some measure of control of the electronics in the electron stream may be had. Application of the principles herein disclosed to such other apparatus can be easily accomplished without departing from the spirit and scope of the claims.

What is claimed is:

1. For use in a traveling wave tube having a slow wave circuit and an electron beam source for projecting an electron beam along said slow wave crcuit in coupling relation thereto, and which utilizes the interaction between the electron beam and a traveling signal wave along the slow wave path to achieve a net amplification of a signal wave, the interaction being characterized by the velocity distribution of electrons in the beam in accordance with the signal wave level, signal input means and signal output means spaced apart along said slow wave circuit, means for imparting to the interaction a predetermined nonlinear amplification characteristic comprising a plurality of first means disposed along a portion of the tube between said signal input and said signal output means establishing a first series of spatially alternating periodic focusing regions for focusing electrons in the beam having velocities corresponding to a first range of signal level and a plurality of second means disposed along a portion of the tube between said signal input and said signal output means establishing a second series of spatially alternating periodic focusing regions differing from said first series for focusing electrons in the beam having velocities corresponding to a second range of signal levels and for defocusing electrons having velocities corresponding to signal levels outside of said second range.

2. Means for imparting to the interaction a predetermined nonlinear amplification characteristic as claimed in claim 1 wherein said first and second means establish magnetic focusing regions.

3. Means for imparting to the interaction a predetermined nonlinear amplification characteristic as claimed in claim 1 wherein said first and second means establish electrostatic focusing regions.

4. For use in a traveling wave tube having a slow wave circuit and an electron beam source for projecting an electron beam along said slow wave circuit in coupling relation thereto, and which utilizes the interaction between the electron beam and a traveling signal wave along the slow wave path to achieve a net amplification of the signal wave, the interaction being characterized by a velocity redistribution of electrons in the beam in accordance with the signal wave level, signal input means and signal output means spaced apart along said slow wave circuit, means for imparting to the interaction a predetermined nonlinear amplification characteristic comprising a plurality of first means equally spaced along a portion of the tube between said signal input and said signal output means establishing a first series of spatially alternating periodic focusing regions for focusing electrons in the beam having velocities corresponding to a first range of signal levels, and a plurality of second means equally spaced along a portion of the tube between said signal input and said signal output means and more remote from the electron beam source than said first means establishing a second series of spatially alternating periodic focusing regions, the strength of the focusing regions in said second series being less than the strength of the focusing reigons in said first series for focusing electrons in the beam having velocities corresponding to a second range of signal levels and for defocusing electrons in the beam having velocities outside of said second range.

5. For use in a traveling wave tube having a slow wave circuit and an electron beam source for projecting an electron beam along said slow wave circuit in coupling relation thereto, and which utilizes the interaction between the electron beam in a traveling signal wave along the slow wave path to achieve a net amplification of the signal wave, the interaction being characterized by a velocity redistribution of electrons in the beam in accordance with signal wave level, signal input means and signal output means spaced apart along said slow wave circuit, means for imparting to the interaction a predetermined nonlinear amplification characteristic comprising a plurality of first means disposed along a portion of the tube between said signal input and said signal output means establishing a first series of periodic focusing regions for focusing electrons in the beams having velocities corresponding to a first range of signal levels, a plurality of second means disposed along a portion of the tube between said signal input and said signal output means establishing a second series of periodic focusing regions differing from said first series for focusing electrons in the beam having velocities corresponding to a second range of signal levels and defocusing electrons having velocities corresponding to signal levels outside of said second range, and a plurality of third means disposed along a portion of the tube intermediate its ends establishing a third series of periodic focusing regions differing from said second series for focusing electrons in the beam having velocities corresponding to a third range of signal levels differing from said second range for focusing electrons in the beam having velocities corresponding to said third range of signal levels and for defocusing electrons having velocities outside of said third range.

6. Means for imparting to the interaction a predetermined nonlinear amplification characteristic as claimed in claim 5 wherein said first, second and third means establish magnetic focusing regions.

7. Means for imparting to the interaction a predetermined nonlinear amplification characteristic as claimed in claim 5 wherein said first, second and third means establish electrostatic focusing regions.

8. For use in a traveling wave tube having a slow wave circuit and an electron beam source for projecting an electron beam along said slow wave circuit in coupling relation thereto, and which utilizes the interaction between the electron beam in a traveling signal wave along the slow wave path to achieve a net amplification of the signal wave, the interaction being characterized by a velocity redistribuiton of electrons in the beam in accordance with signal wave level, signal input means and signal output means spaced apart along said slow wave circuit, means for imparting to the interaction a predetermined nonlinear amplification characteristic comprising a plurality of first means equally spaced along a portion of the tube between said signal input and said signal output means establisihng a first series of periodic focusing regions for focusing electrons in the beam having velocities corresponding to a first range of signal levels, a plurality of second means equally spaced along a portion of the tube between said signal input and said signal output means and more remote from the electron beam source than said first means establishing a second series of periodic focusing regions of lesser strength than said first series for focusing electrons in the beam having velocities corresponding to a second range of signal levels and defocusing electrons having velocities corresponding to signal levels outside of said second range, and a plurality of third means equally spaced along a portion of the tube intermediate its ends establishing a third series of periodic focusing regions of a strength greater than said second series for focusing electrons in the beam having velocities corresponding to said third range of signal levels and for defocusing electrons having velocities outside of said third range.

9. For use in a traveling wave tube having a slow wave circuit and an electron beam source for projecting an electron beam along said slow wave circuit in coupling relation thereto, and which utilizes the interaction between the electron beam in a traveling signal wave along the slow wave path to achieve a net amplification of the signal wave, the interaction being characterized by a velocity redistribution of electrons in the beam in accordance with signal wave level, signal input means and signal output means spaced apart along said slow wave circuit, means for imparting to the interaction a predetermined nonlinear amplification characteristic comprising a plurality of first means equally spaced along a portion of the tube between said signal input and said signal output means establishing a first series of periodic focusing regions for focusing electrons in the beam having velocities corresponding to a first range of signal levels, a plurality of second means equally spaced along a portion of the tube between said signal input and said signal output means establishing a second series of periodic focusing regions, the spacing between successive ones of said second means differing from the spacing between successive ones of said first means for focusing electrons in the beam having velocities corresponding to a second range of signal levels and defocusing electrons having velocities corresponding to signal levels outside of said second range, and a plurality of third means equally spaced along a portion of the tube intermediate its ends establishing a third series of periodic focusing regions, the spacing between successive ones of said third means differing from the spacing between successive ones of said second means, for focusing electrons in the beam having velocities corresponding to said third range of signal levels and for defocusing electrons having velocities outside of said third range.

10. A traveling wave tube amplifier comprising, in combination, an envelope, means including an electron gun and a collector electrode for forming and projecting an electron beam, a wave propagation circuit between said gun and said collector, input coupling means coupled to said circuit adjacent the electron gun, a second wave propagation circuit between said gun and said collector, output coupling means coupled to said circuit adjacent the collector, first means for focusing electrons in said beam disposed along a portion of said tube between said input and output coupling means, second means for focusing electrons in the beam disposed along a second portion of the tube between said input and output coupling means, said second focusing means differing from said first focusing means and third focusing means disposed along a portion of the tube and differing from said second means whereby electrons in the beam having velocities corresponding to a low range of signal levels and electrons in the beam having velocities corresponding to a high range of signal levels are defocused while electrons having velocities corresponding to an intermediate range of signal levels are focused.

11. A traveling wave tube amplifier comprising, in combination, an envelope, means including an electron gun and a collector electrode for forming and projecting an electron beam, a wave propagation circuit between said gun and said collector, input coupling means coupled to said circuit adjacent the electron gun, a second wave propagation circuit between said gun and said collector, output coupling means coupled to said circuit adjacent the collector, said second wave propagation circuit being separated from said first wave propagation circuit by a drift space extending axially of the tube, first means for focusing electrons in said beam disposed along a portion of said tube between said input and output coupling means, second means for focusing electrons in said beam disposed along a second portion of the tube between said input and output coupling means, said second focusing means differing from said first focusing means and third focusing means disposed along a portion of the tube and differing from said second means whereby electrons in the beam having velocities corresponding to a low range of signal levels and electrons in the beam having velocities corresponding to a high range of signal levels are defocused while electrons having velocities corresponding to an intermediate range of signal levels are focused.

12. A traveling wave tube amplifier as claimed in claim 11 wherein said drift space is formed by a reduced diameter portion of said envelope.

13. A traveling wave tube amplifier as claimed in claim 11 wherein said second focusing means extends along said drift space.

14. A traveling wave tube amplifier as claimed in claim 13 wherein said second focusing means comprises a plurality of means establishing a periodic focusing region along said drift space.

15. A traveling wave tube amplifier as claimed in claim 14 wherein said plurality of means comprising said second focusing means establish magnetic periodic focusing regions.

16. An electronic device comprising, in combination, means including an electron gun and a collector electrode for forming and projecting an electron beam, a wave propagation circuit between said gun and said collector, input coupling means coupled to said circuit at one end thereof, output coupling means coupled to said circuit at the other end thereof, said device utilizing the interaction between the electron beam and a signal wave traveling on said wave propagation circuit for achieving a net amplification of the wave, the interaction being characterized by a velocity redistribution of electrons in the beam in accordance with the signal wave level, means for imparting to the interaction a predetermined nonlinear amplification characteristic comprising first means disposed along a portion of the wave propagation circuit for establishing a first focusing region wherein electrons in the beam having velocities corresponding to a first range of signal levels are focused and second means disposed along a different portion of the wave propagation circuit more remote from the electron gun than said first means for establishing a second focusing region of lesser strength than said first region wherein electrons in the beam having velocities corresponding to a second range of signal levels differing from the first range are focused and electrons outside of said second range are defocused.

17. An electronic device as claimed in claim 16 wherein said second focusing region comprises a plurality of periodic focusing fields.

References Cited in the file of this patent

UNITED STATES PATENTS 2,200,039    Nicoll                May 7, 1940
2,300,052    Lindenblad        Oct. 27, 1942

(Other references on following page)

UNITED STATES PATENTS

| | | |
|---|---|---|
| 2,305,884 | Litton | Dec. 22, 1942 |
| 2,369,796 | Ramberg | Feb. 20, 1945 |
| 2,418,349 | Hillier et al. | Apr. 1, 1947 |
| 2,741,718 | Wang | Apr. 10, 1956 |
| 2,776,389 | Peter | Jan. 1, 1957 |
| 2,817,037 | Peter | Dec. 17, 1957 |
| 2,843,788 | Peter | July 15, 1958 |

FOREIGN PATENTS

| | | |
|---|---|---|
| 1,080,230 | France | May 26, 1954 |

OTHER REFERENCES

Article by Mendel, Quate and Yocum, page 800, Proceedings of the I.R.E. for May 1954.